(12) United States Patent
Misoczki et al.

(10) Patent No.: US 10,938,570 B2
(45) Date of Patent: Mar. 2, 2021

(54) TECHNOLOGIES FOR REMOTE ATTESTATION

(71) Applicant: Intel Corporation, Santa Clara, CA (US)

(72) Inventors: Rafael Misoczki, Hillsboro, OR (US); Rachid El Bansarkhani, Raunheim (DE)

(73) Assignee: INTEL CORPORATION, Santa Clara, CA (US)

( * ) Notice: Subject to any disclaimer, the term of this patent is extended or adjusted under 35 U.S.C. 154(b) by 1070 days.

(21) Appl. No.: 15/083,562

(22) Filed: Mar. 29, 2016

(65) Prior Publication Data

US 2017/0230182 A1    Aug. 10, 2017

Related U.S. Application Data

(60) Provisional application No. 62/292,399, filed on Feb. 8, 2016.

(51) Int. Cl.
| | |
|---|---|
| *H04L 9/32* | (2006.01) |
| *H04L 29/06* | (2006.01) |
| *G06F 21/44* | (2013.01) |
| *G06F 21/60* | (2013.01) |
| *H04L 9/08* | (2006.01) |

(52) U.S. Cl.
CPC ............ *H04L 9/3247* (2013.01); *G06F 21/44* (2013.01); *G06F 21/602* (2013.01); *H04L 9/0836* (2013.01); *H04L 9/3255* (2013.01); *H04L 63/065* (2013.01)

(58) Field of Classification Search
CPC ... H04L 9/3247; H04L 9/3255; H04L 9/0836; H04L 63/065; H04L 9/08–0894; G06F 21/602; G06F 21/44
See application file for complete search history.

(56) References Cited

U.S. PATENT DOCUMENTS

| | | | |
|---|---|---|---|
| 6,148,084 A * | 11/2000 | Brands | G06Q 20/02 380/279 |
| 7,337,315 B2 * | 2/2008 | Micali | G06Q 20/02 380/30 |
| 2005/0028009 A1 * | 2/2005 | Neff | H04L 9/0825 726/4 |

(Continued)

OTHER PUBLICATIONS

"Merkle signature scheme", Mar. 2016, https://en.wikipedia.org/wiki/Merkle_signature_scheme.

*Primary Examiner* — Matthew T Henning
(74) *Attorney, Agent, or Firm* — Jaffery Watson Mendonsa & Hamilton LLP

(57) ABSTRACT

Technologies for remote attestation include a group member device to generate a signature of a message using a cryptographic key assigned to the group member device by a group manager and determine an authentication path that indicates a plurality of cryptographic hashes necessary to compute a group public key of a group associated with a plurality of group member devices. The cryptographic key is assigned to the group member device based on a permutation of a set of cryptographic keys generated by the plurality of group member devices. The group member device transmits the signature and the authentication path to a verifier device for verification of the signature.

19 Claims, 9 Drawing Sheets

(56) References Cited

U.S. PATENT DOCUMENTS

| | | | |
|---|---|---|---|
| 2006/0095763 A1* | 5/2006 | Iyengar | H04L 9/3236 713/167 |
| 2007/0143608 A1* | 6/2007 | Zeng | H04L 9/3263 713/168 |
| 2013/0083926 A1* | 4/2013 | Hughes | H04L 9/0836 380/278 |
| 2014/0047242 A1* | 2/2014 | Ukil | H04W 12/04 713/171 |

* cited by examiner

TECHNOLOGIES FOR REMOTE ATTESTATION

CROSS-REFERENCE TO RELATED U.S. PATENT APPLICATION

The present application claims priority under 35 U.S.C. § 119(e) to U.S. Provisional Application Ser. No. 62/292,399, entitled "Technologies for Quantum-Resistant Hash-Based Anonymous Remote Attestation," which was filed on Feb. 8, 2016.

BACKGROUND

Anonymous remote attestation mechanisms allow a hardware and/or software platform to attest its authenticity to external verifying entities (e.g., an Original Equipment Manufacturer (OEM)) without revealing the identity of the platform to the verifying entity. For example, Enhanced Privacy ID (EPID) is based on cryptographic schemes for which their security relies on the "hardness" of Elliptic Curve and Pairing-based cryptography. However, it is well known in the industry that both Elliptic Curve and Pairing-based cryptography can be broken by quantum computers.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
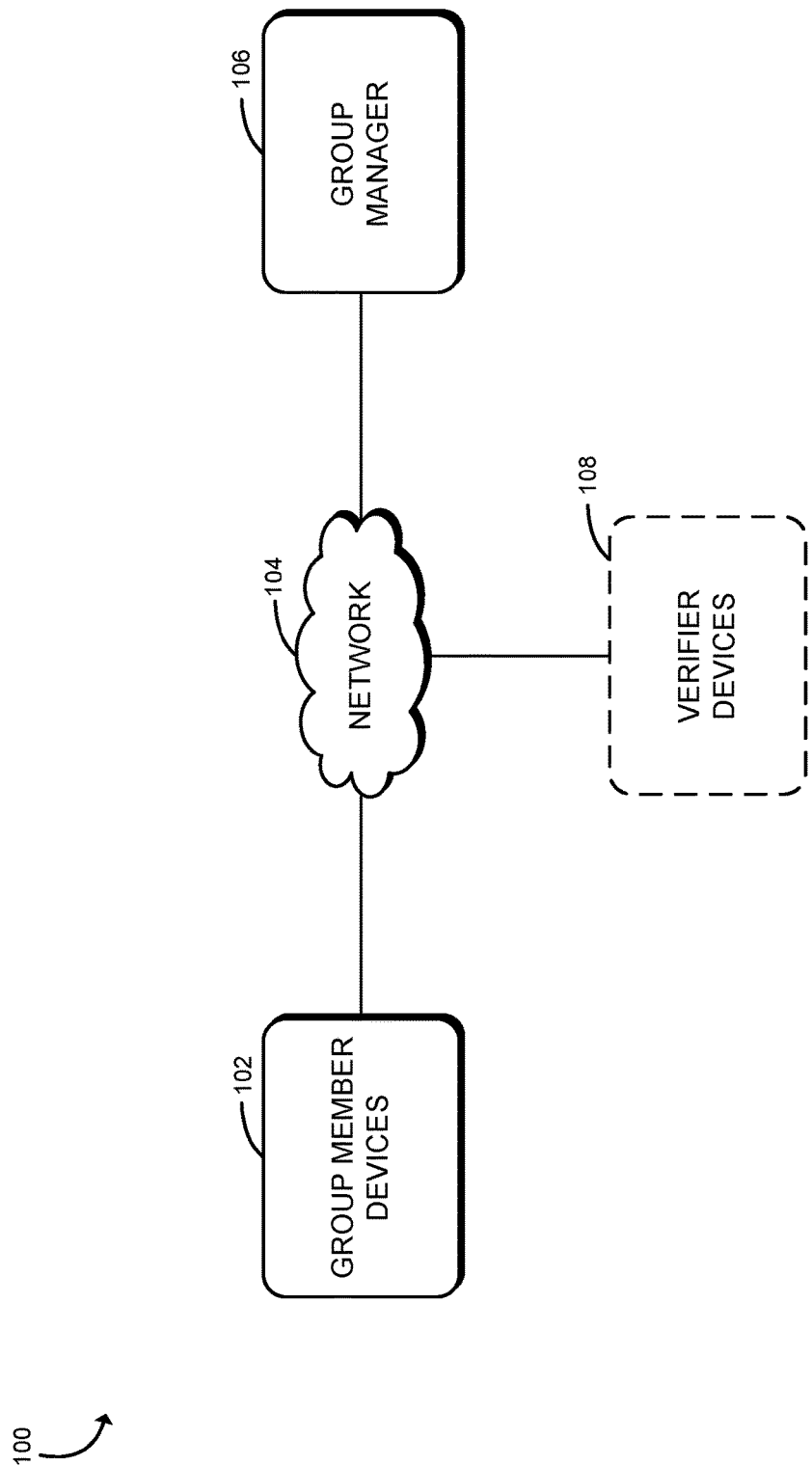
FIG. 1 is a simplified block diagram of at least one embodiment of a system for remote attestation.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for remote attestation is shown. In particular, it should be appreciated that the illustrative system 100 permits quantum-resistant hash-based anonymous remote attestation. As described in detail below, in the illustrative embodiment, the system 100 implements a privacy-preserving mechanism based on hash-based digital signatures. In particular, in some embodiments, the system 100 utilizes Merkle signatures, of modified versions thereof, to achieve a group signature scheme and a "mixing" technique using a strong cryptographic mixer (e.g., a block cipher with the group manager holding the secret cryptographic key) in order to achieve signature unlinkability and anonymity (with traceability for the group manager 106). By doing so, it should be appreciated that the system 100 may be resistant to quantum-based attacks (e.g., unlike Elliptic Curves and pairing-based cryptography) and/or may be quasi-optimal with respect to many relevant metrics (e.g., all or almost all relevant metrics). In some embodiments, the scheme is built upon Merkle hash-based signatures and only a hash function and block cipher are required as fundamental building blocks of the scheme, which may enable unlinkability between any two signatures issued by the same signatory/signer. Further, in some embodiments, the system 100 involves an attestation scheme that is quasi-optimal in the signature size increasing only with the number of group members (e.g., Log N*(Hash_Output_Size)+signature size). The scheme may require only hash computations and block cipher operations (i.e., for key generation) that allow for operation speeds similar to conventional single-signer Merkle constructions.

Depending on the particular embodiment, the attestation scheme of the system 100 may employ various security, privacy, and/or revocation features. For example, the attestation scheme implements unforgeability such that a valid signature can only be produced by group members holding a private key (i.e., non-group members cannot produce a valid signature). Further, the scheme may employ anonymity such that it is impossible to identify the issuer of a given signature out of a group and any group member can be the signer of a document and/or may employ unlinkability such that it is computationally infeasible to determine if two or more signatures were issued by the same source (i.e., all group members may produce identically distributed signatures, leaking no information about the corresponding originators). In some embodiments, the scheme may utilize a verifier-linked mode in which the signer allows the verifier to be able to link two signatures oriented from the same signer. Unlike other schemes that result in untraceability, in some embodiments, the illustrative attestation scheme allows the group manager 106 to utilize trace features (e.g., to identify the originator of a signature). In some embodiments, the attestation scheme may provide for private key based revocation such that an arbitrary verifier of signature is permitted to identify all signatures issued by a signer with a revoked secret key. Further, in some embodiments involving signature-based revocation, a signer must convince the verifier that it is not the issuer of a revoked signature.

It should be appreciated that a traditional Merkle signature scheme construction turns a one-time signature (OTS) scheme, such as Winternitz OTS scheme, into a multi-time signature scheme. An OTS scheme includes a private key, sk, used to sign and a public key, pk, used to verify the signature and are limited in that a single private key is only used to sign one message since multiple uses of the same private key may compromise the security of the scheme. As such, Merkle schemes utilize a tree to authenticate an exponential number of OTS public keys, which binds an exponentially high number of OTS public keys to a single multi-time public key, PK. In the illustrative embodiment, the number of key is exponential in the height of the tree but still relatively small as such keys/signatures must be computed. Further, a signature generated with the set of OTS private keys may be validated with a single public key (i.e., the Merkle public key, PK).

As shown in FIG. 1, the system 100 includes a plurality of group member devices 102, a network 104, and a group manager 106. Additionally, in some embodiments, the system 100 may include one or more verifier devices 108. Although only one network 104 is illustratively shown in FIG. 1, the system 100 may include any number of networks 104 in other embodiments. For example, in some embodiments, a group member device 102 and the group manager 106 may communicate with one another over a first network 104, and the group member device 102 may communicate with a verifier device 106 (e.g., another group member device 102) over another network 104.

As described below, each of the group member devices 102 belongs to a group associated with the group manager 106. In the illustrative embodiment, each of the group member devices 102 generates at least one cryptographic key pair including a public cryptographic key and a private cryptographic key and generates cryptographic hash of each public cryptographic key (see, for example, nodes 906 of FIGS. 9-10). The cryptographic hashes, public cryptographic keys, and/or other identifying information may be transmitted to the group manager 106, which may reassign such data to the group member devices 102 (e.g., via a randomized permutation) as described in further detail below. By doing so, a Merkle scheme may be utilized for a group signature while preventing the verifier device 106 from identifying the group member device 102 that issued a particular signature. The group manager 106 may store various data associated with the cryptographic signature scheme, which may, for example, enable to group manager 106 to trace such signatures and perform key revocation and/or other administrative functions related to the group.

In some embodiments, the group member devices 102 may communicate with one another such that one group member device 102 signs a message for verification by another group member device 102. In such embodiments, the verifying group member device 102 may act as a verifier device 108. However, it should be appreciated that, in other embodiments, one of the group member devices 102 may attest to (and generated a signature for verification by) a verifier device 108 other than a group member device 102.

Figure 2:
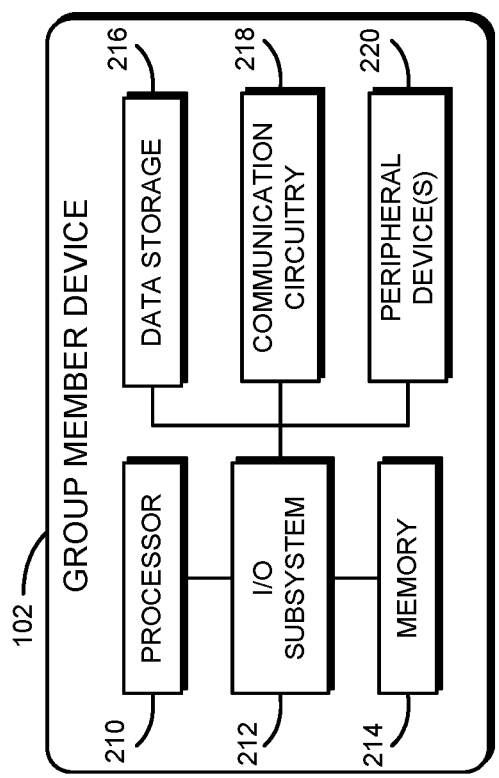
FIG. 2 is a simplified block diagram of at least one embodiment of a group member device of the system of FIG. 1.

Referring now to FIG. 2, each of the group member devices 102 may be embodied as any type of computing device capable of performing the functions described herein. For example, in some embodiments, each of the group member devices 102 may be embodied as a laptop computer, tablet computer, notebook, netbook, Ultrabook™, a smartphone, cellular phone, wearable computing device, personal digital assistant, mobile Internet device, desktop computer, router, server, workstation, and/or any other computing/communication device. As shown in FIG. 2, each of the illustrative group member devices 102 includes a processor 210, an input/output ("I/O") subsystem 212, a memory 214, a data storage 216, a communication circuitry 218, and one or more peripheral devices 220. Of course, the group member devices 102 may include other or additional components, such as those commonly found in a typical computing device (e.g., various input/output devices, peripheral devices, and/or other components), in other embodiments. Additionally, in some embodiments, one or more of the illustrative components may be incorporated in, or otherwise form a portion of, another component. For example, the memory 214, or portions thereof, may be incorporated in the processor 210 in some embodiments.

The processor 210 may be embodied as any type of processor capable of performing the functions described herein. For example, the processor 210 may be embodied as a single or multi-core processor(s), digital signal processor, microcontroller, or other processor or processing/controlling circuit. Similarly, the memory 214 may be embodied as any type of volatile or non-volatile memory or data storage capable of performing the functions described herein. In operation, the memory 214 may store various data and software used during operation of the corresponding group member device 102 such as operating systems, applications, programs, libraries, and drivers. The memory 214 is communicatively coupled to the processor 210 via the I/O subsystem 212, which may be embodied as circuitry and/or components to facilitate input/output operations with the processor 210, the memory 214, and other components of the group member device 102. For example, the I/O subsystem 212 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 212 may form a portion of a system-on-a-chip (SoC) and be incorporated, along with the processor 210, the memory 214, and other components of the group member device 102, on a single integrated circuit chip.

The data storage 216 may be embodied as any type of device or devices configured for short-term or long-term storage of data such as, for example, memory devices and circuits, memory cards, hard disk drives, solid-state drives, or other data storage devices. The data storage 216 and/or the memory 214 may store various data during operation of the group member device 102 as described herein.

The communication circuitry 218 may be embodied as any communication circuit, device, or collection thereof, capable of enabling communications between the group member device 102 and other remote devices over a network (e.g., the network 104). The communication circuitry 218 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

The peripheral devices 220 may include any number of additional peripheral or interface devices, such as speakers, microphones, additional storage devices, and so forth. The particular devices included in the peripheral devices 220 may depend on, for example, the type and/or intended use of the group member device 102.

Referring back to FIG. 1, the network 104 may be embodied as any type of communication network capable of facilitating communication between the group member devices 102 and remote devices (e.g., the group manager 106 and/or the verifier devices 108). As such, the network 104 may include one or more networks, routers, switches, computers, and/or other intervening devices. For example, each network 104 may be embodied as or otherwise include one or more cellular networks, telephone networks, local or wide area networks, publicly available global networks (e.g., the Internet), an ad hoc network, or any combination thereof.

Each of the group manager 106 and/or the verifier devices 108 may be embodied as any type of computing device capable of performing the functions described herein. For example, in some embodiments, group manager 106 and/or the verifier device 108 may be embodied as a desktop computer, workstation, server, laptop computer, tablet computer, notebook, netbook, Ultrabook™, cellular phone, smartphone, personal digital assistant, mobile Internet device, wearable computing device, Hybrid device, and/or any other computing/communication device. Further, the group manager 106 and/or the verifier device 108 may include components similar to those of the group member device 102 discussed above. The description of those components of the group member device 102 is equally applicable to the description of components of the group manager 106 and/or the verifier device 108 and is not repeated herein for clarity of the description. Further, it should be appreciated that the group manager 106 and/or the verifier device 108 may include other components, sub-components, and devices commonly found in a computing device, which are not discussed above in reference to the group member device 102 and not discussed herein for clarity of the description. In some embodiments, one or more of the components of the group member device 102 may be omitted from the group manager 106 and/or the verifier device 108.

Figure 3:
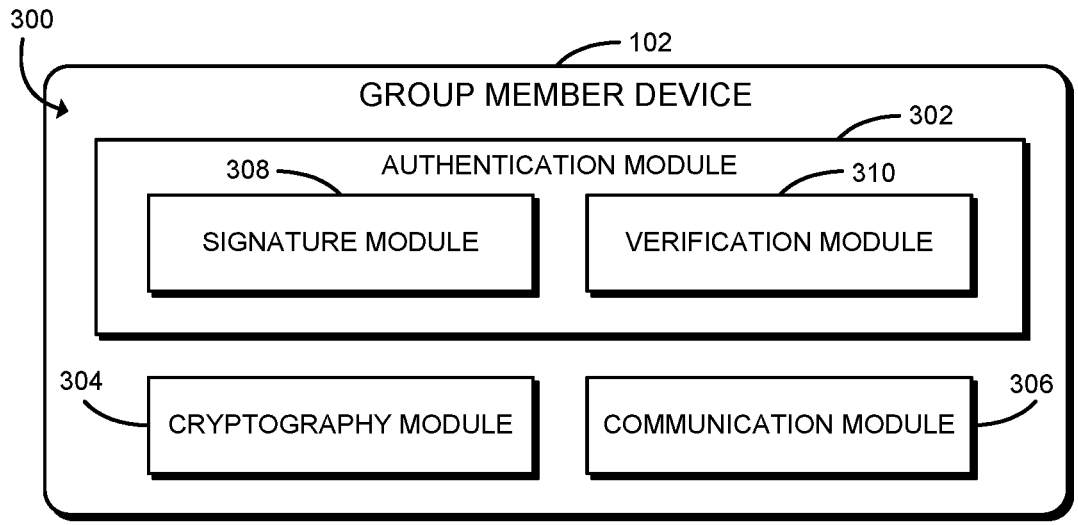
FIG. 3 is a simplified block diagram of at least one embodiment of an environment of the group member device of FIG. 2.

Referring now to FIG. 3, in use, the group member device 102 establishes an environment 300 for remote attestation. The illustrative environment 300 includes an authentication module 302, a cryptography module 304, and a communication module 306. Additionally, the illustrative authentication module 302 includes a signature module 308 and a verification module 310. The various modules of the environment 300 may be embodied as hardware, software, firmware, or a combination thereof. For example, the various modules, logic, and other components of the environment 300 may form a portion of, or otherwise be established by, the processor 210 or other hardware components of the group member device 102. As such, in some embodiments, one or more of the modules of the environment 300 may be embodied as circuitry or collection of electrical devices (e.g., an authentication circuitry, a cryptography circuitry, a communication circuitry, a signature circuitry, and/or a verification circuitry). Additionally, in some embodiments, one or more of the illustrative modules may form a portion of another module and/or one or more of the illustrative modules may be independent of one another. Further, in some embodiments, one or more of the modules of the environment 300 may be omitted from a particular group member device 102 (e.g., the verification module 310).

The authentication module 302 is configured to perform various signature, verification, and/or other authentication functions on behalf of the group member device 102. As indicated above, the illustrative authentication module 302 includes the signature module 308 and the verification module 310. The signature module 308 is configured to generate cryptographic signatures of various messages on behalf of the group member device 102 (e.g., in conjunction with the cryptography module 304) based on the techniques described herein. For example, as described below, the signature module 308 may generate a signature of a message using a private cryptographic key assigned to the group member device 102 by the group manager 106 and determine an authentication path in a modified Merkle tree for transmittal to the verifier device 108. As described below, the verifier device 108 may utilize a corresponding public cryptographic key of the group member device 102 and the authentication path to generate a group public key and verify the validity of the signature.

The verification module 310 is configured to verify the validity of a signature included with a signed message transmitted from another group member device 102. As indicated above, depending on the particular embodiment, the verifier device 108 may be a group member device 102 or another compute device not belonging to the group (e.g., the group associated with the group manager 106). As described below, the verification module 310 may receive a signature of a message generated by a group member device 102 and an authentication path that identifies the cryptographic hashes necessary to compute/rebuild the group public key of the group (see, for example, the public key PK of FIGS. 9-10) and verify the signature based on a public cryptographic key of the group member device 102 corresponding with the private cryptographic key used to sign the message. Further, the verification module 310 may utilize, for example, a Merkle tree scheme to compute/rebuild the group public key based on the public cryptographic key of the group member device 102 and the authentication path and compare that computed group public key to the actual group public key (e.g., stored on the group member device 102 and/or retrieved from the group manager 106 or another compute device). In the illustrative embodiment, if the keys match, the signature is considered to be valid. Of course, in other embodiments, the system 100 may utilize additional security, privacy, and/or integrity measures. It should be appreciated that, depending on the particular embodiment, a particular group member device 102 or verifier device 108 may only be capable of signing (and therefore include the signature module 308), may only be capable of verifying (and therefore include the verification module 310), or be capable of both signing and verifying (and therefore include both the signature module 308 and the verification module 310).

The cryptography module 304 is configured to perform various cryptographic and/or security functions on behalf of the group member device 102. In some embodiments, the cryptography module 304 may be embodied as a cryptographic engine, an independent security co-processor of the group member device 102, a cryptographic accelerator incorporated into the processor 210, or a standalone software/firmware. Depending on the particular embodiment, the cryptography module 304 may generate and/or utilize various cryptographic keys (e.g., symmetric/asymmetric cryptographic keys) for encryption, decryption, signing, and/or signature verification. Additionally, in some embodiments, the cryptography module 304 may establish a secure connection with remote devices over a network. It should further be appreciated that, in some embodiments, the cryptography module 304 and/or another module of the group member device 102 may establish a trusted execution environment or secure enclave within which a portion of the data described herein may be stored and/or a number of the functions described herein may be performed.

The communication module 306 is configured to handle the communication between the group member device 102 and other computing devices of the system 100. It should be appreciated that the communication module 306 may utilize any suitable algorithm or protocol for such communication.

Figure 4:
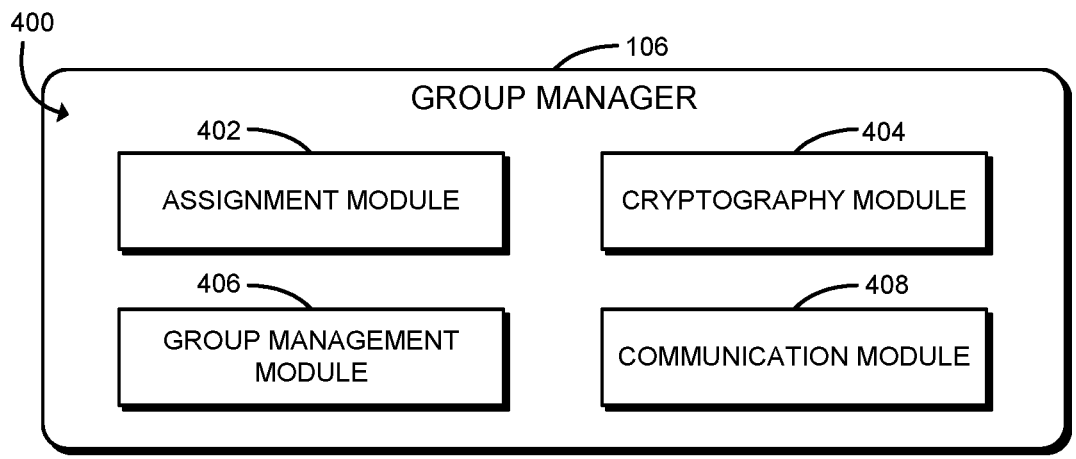
FIG. 4 is a simplified block diagram of at least one embodiment of an environment of a group manager of the system of FIG. 1.

Referring now to FIG. 4, in use, the group manager 106 establishes an environment 400 for remote attestation. The illustrative environment 400 includes an assignment module 402, a cryptography module 404, a group management module 406, and a communication module 408. The various modules of the environment 400 may be embodied as hardware, software, firmware, or a combination thereof. For example, the various modules, logic, and other components of the environment 400 may form a portion of, or otherwise be established by, the processor or other hardware components of the group manager 106. As such, in some embodiments, one or more of the modules of the environment 400 may be embodied as circuitry or collection of electrical devices (e.g., an assignment circuitry, a cryptography circuitry, a group management circuitry, and/or a communication circuitry). Additionally, in some embodiments, one or more of the illustrative modules may form a portion of another module and/or one or more of the illustrative modules may be independent of one another.

The assignment module 402 is configured to handle the reassignment of the cryptographic hashes and/or corresponding cryptographic keys generated by the group member devices 102. For example, in some embodiments, each of the group member devices 102 may generate one or more public-private cryptographic key pairs and a cryptographic hash of each of the corresponding public cryptographic keys (see, for example, the Merkle tree depicted in FIG. 9), which may be transmitted to the group manager 106. In such embodiments, the assignment module 402 may reassign those keys/hashes as shown in FIG. 10, for example, to prevent the verifier device 106 from identifying the signer of a particular message. In some embodiments, the assignment module 402 may reassign the keys/hashes based on a permutation (e.g., a random permutation) of the cryptographic hashes. For example, in some embodiments, the assignment module 402 may apply a block cipher to the cryptographic hashes and/or utilize another suitable algorithm to randomly permute the cryptographic hashes.

Figure 9:
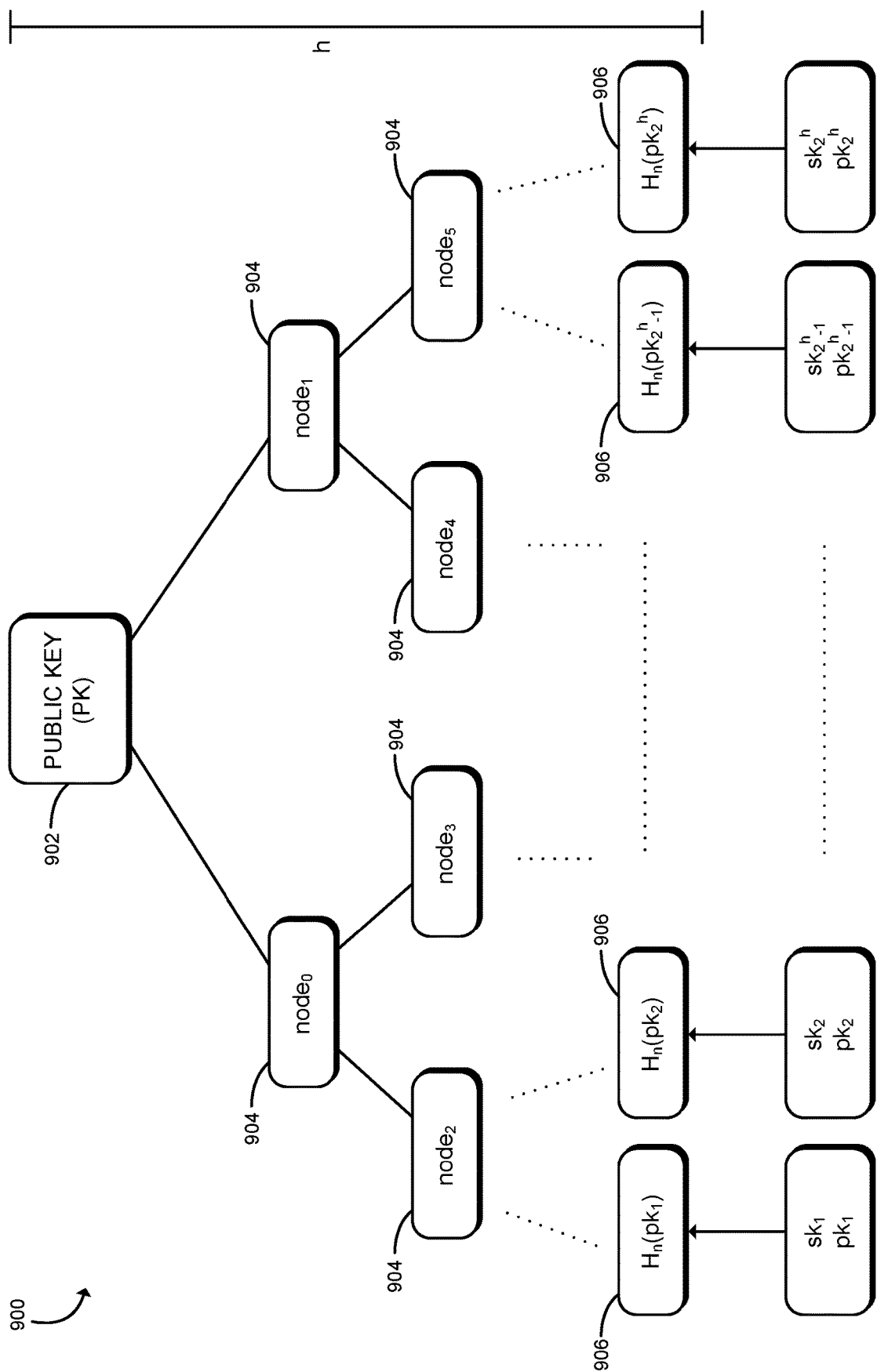
FIGS. 9-10 are simplified block diagrams of illustrative embodiments of a modified Merkle tree.
Figure 10:
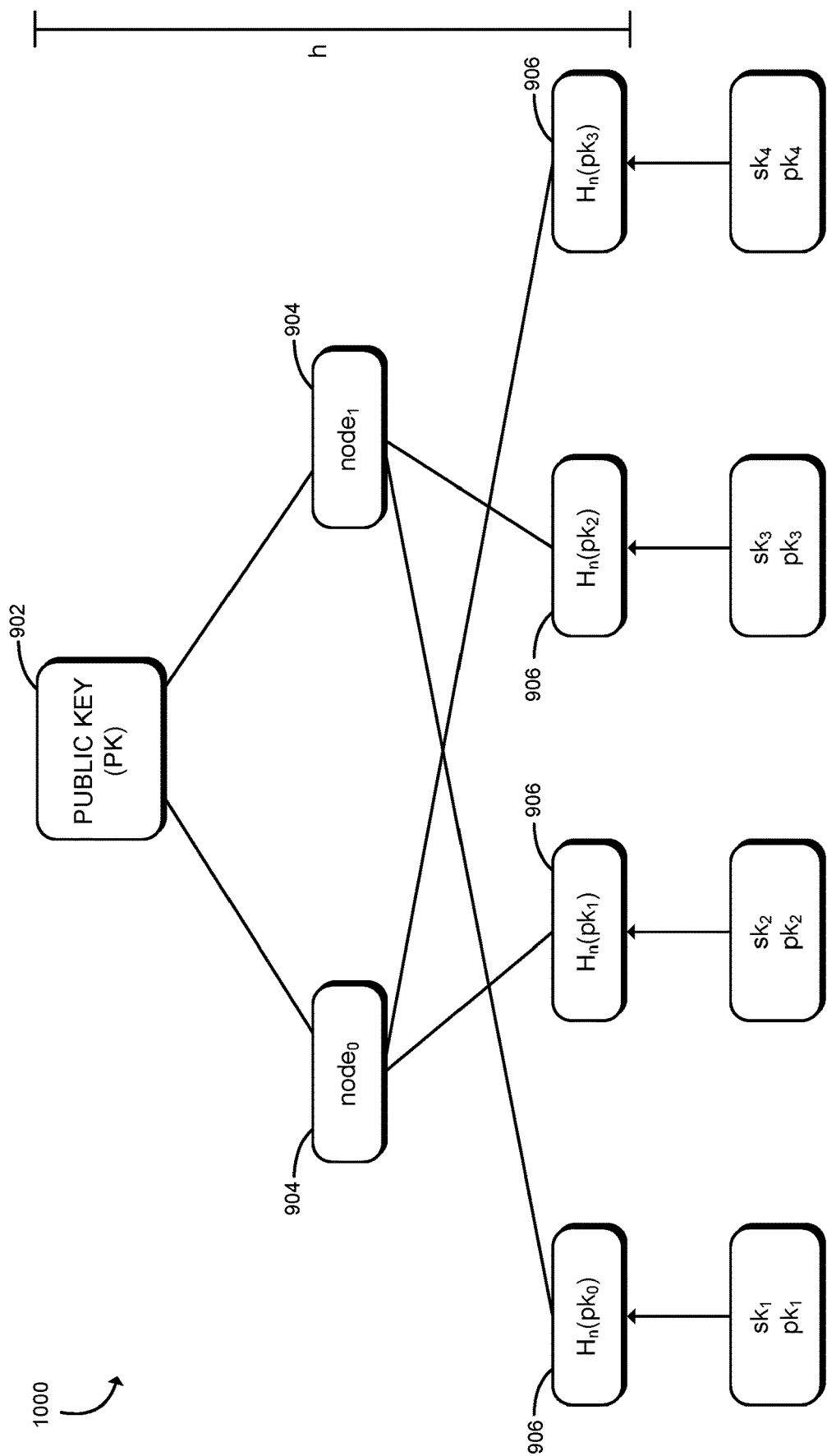

As shown in FIG. 9, it should be appreciated that a Merkle tree 900 includes a root node 902, which includes the group public key PK, a set of intermediary nodes 904, and a set of leaf nodes 906. In the illustrative embodiment, the leaf nodes 906 are initially indicative of a cryptographic hash of a corresponding public cryptographic key generated by each of the group member device 102. Depending on the particular embodiment, each of the group member devices 102 generates the cryptographic hashes for, or is otherwise associated with or responsible for, one or more of the leaf nodes 906 of the Merkle tree 900. Further, it should be appreciated that the number of intermediary nodes in the Merkle tree 900 may vary depending on the number of leaf nodes 906 and therefore the height, h, of the corresponding tree structure. As such, the system 100 may include any number of intermediary nodes 904 and leaf nodes 906 depending on the particular embodiment.

In some embodiments, the leaf nodes 906 are related to one time signature (OTS) public cryptographic keys, pk, and the intermediate nodes 904 are constructed from the hash of the two children nodes (e.g., $node_i = H(node_{2i} \| node_{2i+1})$), and the root of the tree, PK, is a multi-use group public key. As described herein, the signature process consists of signing a message with the OTS signing key according to an OTS signing procedure and computing some inner nodes (i.e., in the "authentication path"). Further, the verification process involves verifying the OTS signature, which produces the OTS pk if successful. As such, a verifier of the system 100 may be able to re-build the root node, PK, if the signature is authentic but reject access if the process does not result in PK.

In the illustrative embodiment, the system 100 distributes an equal number of leaf nodes 906 to each group member in such a way that each group member can generate a certain number of valid signatures (e.g., with the Merkle scheme as a group signature). A valid signature may be used to prove its membership to an entity (e.g., a verifier or verifying entity) and the authenticity of such signature may be validated using the single public key, PK, of the group. In some embodiments, the leaf nodes 906 of the system 100 are generated by, assigned to, or otherwise associated with the group member devices 102 such that a subtree of the Merkle tree 900 is effectively distributed to each group member device 102 for signature generation. In in some embodiments, the signatures generated by the leaves in the same subtree may be linked to one another, as the signatures produced by subsequent leaf nodes 906 may have in their authentication path the same node at some intermediate level. It should be appreciated that the techniques described herein present a mechanism to avoid such linkability.

Accordingly, as shown in FIG. 10, the order of the leaf nodes 906 given to each group member may be permuted or otherwise reassigned (e.g., by a block cipher operation). By doing so, it should be appreciated that the verifier cannot determine from the corresponding authentication path which signer issued the signature. In particular, as described below, in the illustrative embodiment, the group manager 106 may mix the positions of the leaf nodes 906 using, for example, a block cipher outputting $\log_2(N \cdot 2^l)$ bits, where $N=2^b$ denotes the number of group member devices 102. Of course, the group manager 106 may use any other suitable technique, algorithm, or mechanism to mix the positions of the leaf nodes 906 in other embodiments. Based on the mixed set of leaf nodes 906, the group manager 106 may build a Merkle tree 1000 of height l+b (e.g., b layers higher than a Merkle tree used for standard single-signer signatures). Further, each group member device 102 may be given a set of indices associated with the position of its leaf nodes 906, $C_i=\{(i-1) \cdot 2^l+1, \ldots, i \cdot 2^l\} \rightarrow \{Enc_k[(i-1) \cdot 2^l+1], \ldots, Enc_k[i \cdot 2^l]\}$, and the group manager 106 may maintain the block cipher key k as a secret.

Returning to FIG. 4, the cryptography module 404 of the group manager 106 is configured to perform various cryptographic and/or security functions on behalf of the group manager 106. In some embodiments, the cryptography module 404 may be embodied as a cryptographic engine, an independent security co-processor of the group manager 106, a cryptographic accelerator incorporated into the processor of the group manager 106, or a standalone software/firmware. Depending on the particular embodiment, the cryptography module 404 may generate and/or utilize various cryptographic keys (e.g., symmetric/asymmetric cryptographic keys) for encryption, decryption, signing, and/or signature verification. Additionally, in some embodiments, the cryptography module 404 may establish a secure connection with remote devices over a network. It should further be appreciated that, in some embodiments, the cryptography module 404 and/or another module of the group manager 106 may establish a trusted execution environment or secure enclave within which a portion of the data described herein may be stored and/or a number of the functions described herein may be performed.

The group management module 406 is configured to perform various security, privacy, revocation, attestation, and/or other management functions. For example, in some embodiments, signature-based revocation can be achieved by storing and processing the "opening" process into a secure enclave (e.g., Intel® SGX) or other trusted execution environment that has access to the master block-cipher key, k. As such, when a signer wishes to check a signature for revocation, the signer may send the signature and a signed request (with a signed revocation list) to the trusted execution environment, which in turn verifies the signed request and compares the respective signature with the entries in the revocation list. Accordingly, in such embodiments, the trusted execution environment may internally reveal the identities of the signers in the revocation list and compare them with the issuer of the requested signature. If the signature belongs to a revoked identity, the trusted execution environment may indicate so (e.g., with a binary output of yes/no, 1/0, etc.). Further, as described above, in some embodiments, the group management module 406 may enable the group manager 106 to trace the identity of the group member device 102 that signed a particular message.

The communication module 408 is configured to handle the communication between the group manager 106 and other computing devices of the system 100. It should be appreciated that the communication module 408 may utilize any suitable algorithm or protocol for such communication.

Figure 5:
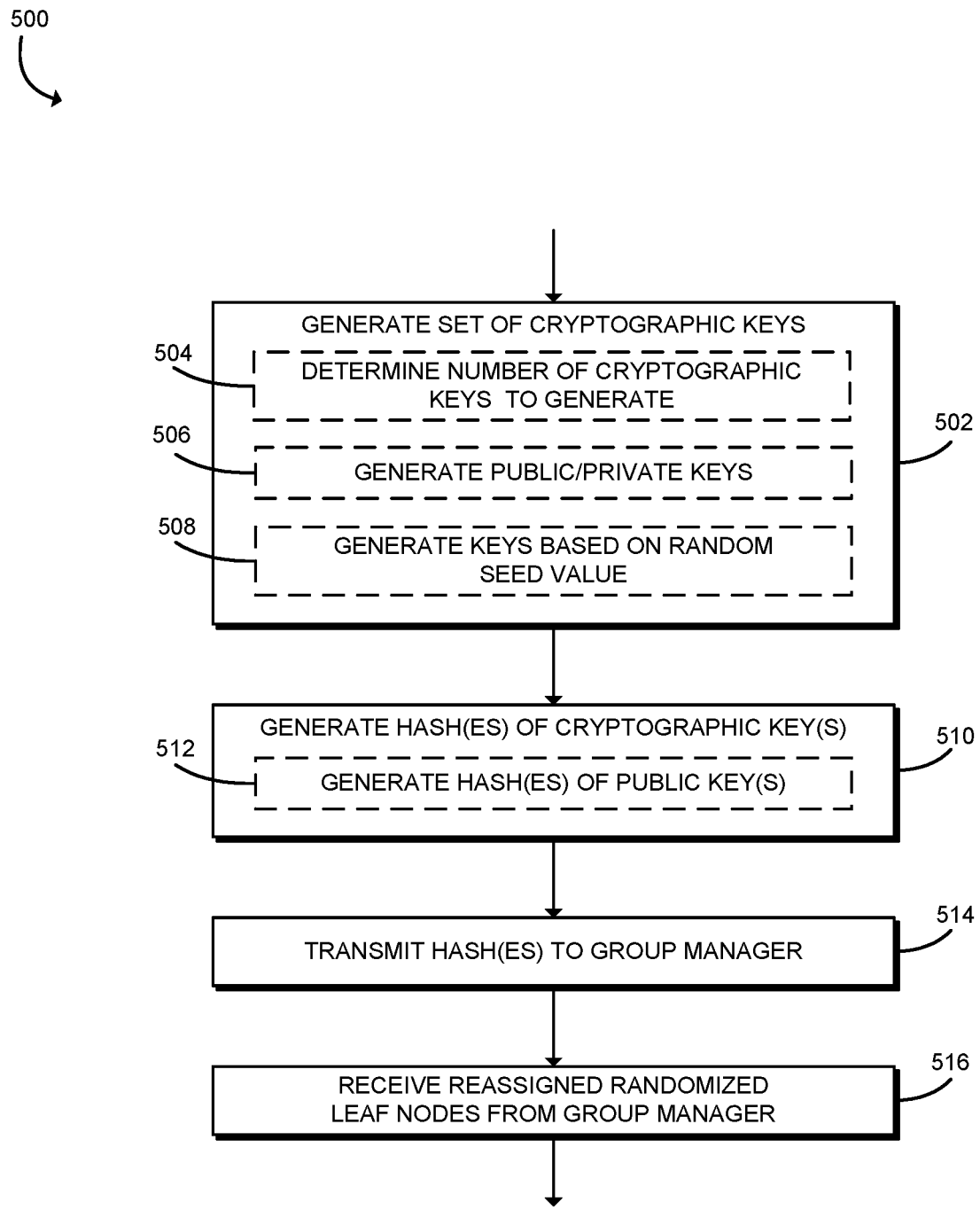
FIG. 5 is a simplified flow diagram of at least one embodiment of a method for establishing a remote attestation scheme by the group member device of the system of FIG. 1.

Referring now to FIG. 5, in use, each of the group member devices 102 may execute a method 500 for establishing a remote attestation scheme. It should be appreciated that, in some embodiments, the techniques of the method 500 may be executed by one or more of the modules of the environment 300 of the group member device 102 as shown in FIG. 3. The illustrative method 500 begins with block 502 in which the group member device 102 generates a set of cryptographic keys for remote attestation. In doing so, in block 504, the group member device 102 may identify or determine the number of cryptographic keys to generate, for example, based on a pre-determined parameter or a decision of the group manager 106. For example, in some embodiments, the group member device 102 may retrieve a public parameter that identifies the number of signature/keys to generate. In other embodiments, the group member device 102 may receive an instruction from the group manager 106 to generate a particular number of keys/signatures. In the illustrative embodiment, it should be appreciated that each group member 102 of the group generates the same number of keys/signatures. In other embodiments, the number of cryptographic keys may be pre-determined or inherent in the key generation scheme in such a way that it is unnecessary to determine the number of keys to generate.

Further, in some embodiments, the group member device 102 may generate one or more pairs of public/private cryptographic keys (i.e., an asymmetric key pair) in block 506. In particular, in block 508, the group member device 102 may generate the cryptographic keys based on a random seed value. For example, in some embodiments, in order to generate the cryptographic keys, each group member device 102, $S_i$, samples a random seed, $k_i$, serving as the secret key. From $k_i$, the group member device 102 may generate a set/sequence of secret keys $sk_i^j = PRNG^j(k_i)$, using a secure pseudorandom number generator, where j runs from 1 to the number of signatures expected to be issued. It should be appreciated that the number of signatures issued per group member device 102 may vary depending on the particular embodiment as described above. In some embodiments, the number of signatures may be as large as $2^l$ for each signer. The group member device 102 may compute the corresponding public keys $pk_i^j$ from $sk_i^j$ using a suitable cryptographic algorithm. Of course, it should be appreciated that the group member device 102 may otherwise generate the public/private cryptographic key pair(s) and/or other cryptographic keys using another suitable cryptographic algorithm.

In block 510, the group member device 102 generates cryptographic hashes of the generated cryptographic keys using a suitable cryptographic hashing algorithms (e.g., a Secure Hash Algorithm or message-digest algorithm). In particular, in block 512, the group member device 102 generates cryptographic hashes of the public cryptographic key(s) generated by the corresponding group member device 102. In block 514, the group member device 102 transmit the generated cryptographic hashes to the group manager 106.

As described herein, in the illustrative embodiment, the cryptographic hashes of the public keys serve as the leaf nodes 906 of the Merkle tree 900, 1000 and are provided to the group manager 106. Subsequently, the group manager 106 mixes, permutes, or randomizes the positions of the leaf nodes 906 using, for example, a block cipher outputting $\log_2(N \cdot 2^l)$ bits, where $N=2^b$ denotes the number of group member devices 102. Of course, the group manager 106 may use any other suitable technique, algorithm, or mechanism to mix the positions of the leaf nodes 906 in other embodiments. In block 516, the group member device 102 receives the reassigned randomized leaf nodes 906 (e.g., the cryptographic hashes, keys, and/or other suitable indicia) from the group manager 106. For example, based on the mixed set of leaf nodes 906, the group manager may build a new Merkle tree 1000 and/or each group member device 102 may be given, for example, a set of indices associated with the position of its leaf node(s) 906, $C_i = \{(i-1) \cdot 2^l + 1, \ldots, i \cdot 2^l\} \rightarrow \{Enc_k[(i-1) \cdot 2^l + 1], \ldots, Enc_k[i \cdot 2^l]\}$.

Figure 6:
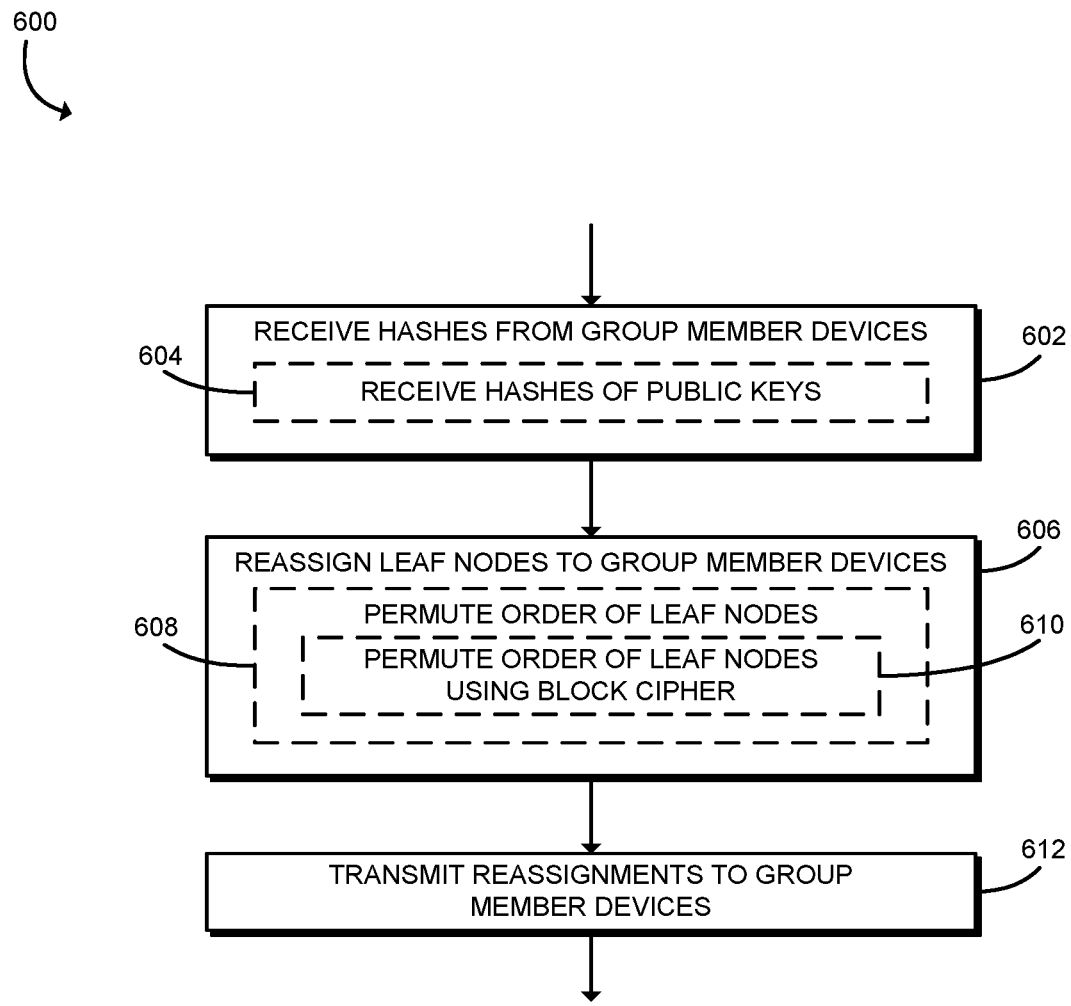
FIG. 6 is a simplified flow diagram of at least one embodiment of a method for establishing the remote attestation scheme by the group manager of the system of FIG. 1.

Referring now to FIG. 6, in use, the group manager 106 may execute a method 600 for establishing a remote attestation scheme. It should be appreciated that, in some embodiments, the techniques of the method 600 may be executed by one or more of the modules of the environment 400 of the group manager 106 as shown in FIG. 4. The illustrative method 600 begins with block 602 in which the group manager 106 receives the cryptographic hashes from the group member devices 102. In particular, in block 604, the group manager 106 may receive cryptographic hashes of the public cryptographic keys generated by the group member devices 102 as described above. In block 606, the group manager 106 reassigns the leaf nodes 906 and, therefore, the corresponding cryptographic hashes/keys to the group member devices 102 as described above. In particular, in block 608, the group manager 106 may permute the original order of the leaf nodes 906 or, more specifically, of the cryptographic hashes. For example, in block 610, the group manager 106 may permute the order of the leaf nodes 906 by applying a cryptographic block cipher to the leaf nodes 906, the cryptographic hashes, and/or the cryptographic keys generated by the group member devices 102 as described above. In block 612, the group manager 106 transmits the reassignments to the group member devices 102.

Figure 7:
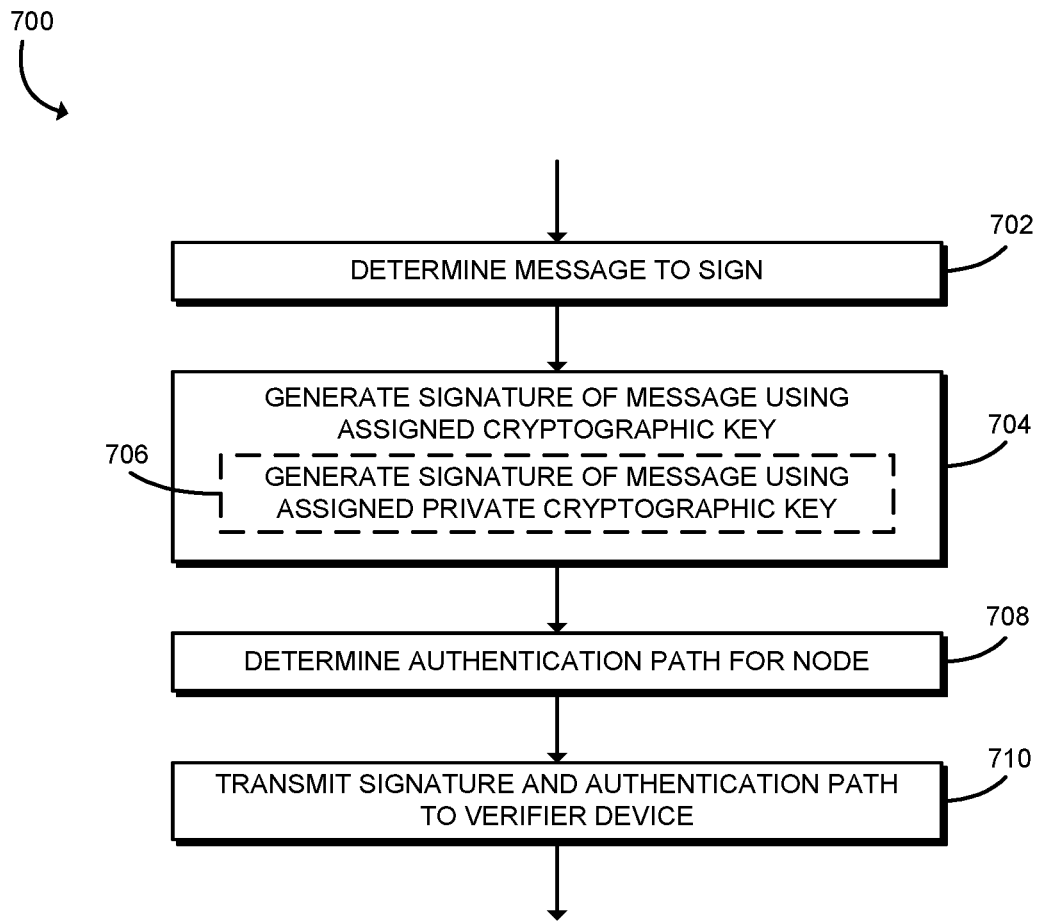
FIG. 7 is a simplified flow diagram of at least one embodiment of a method for generating cryptographic signatures by the group member device of the system of FIG. 1.

Referring now to FIG. 7, in use, the group member device 102 may execute a method 700 for generating cryptographic signatures. It should be appreciated that, in some embodiments, the techniques of the method 700 may be executed by one or more of the modules of the environment 300 of the group member device 102 as shown in FIG. 3. The illustrative method 700 begins with block 702 in which the group member device 102 determines which message to sign and transmit to a verifier device 108. In block 704, the group member device 102 generates a signature of the message using the assigned cryptographic key (e.g., using the cryptographic key assigned to the group member device 102 by the group manager 106). In particular, in block 706, the group member device 102 generates a signature of the message using an assigned private cryptographic key. It should be appreciated that the group member device 102 may utilize any suitable cryptographic algorithm/scheme to generate the signatures described herein. In some embodiments, the group member device 102 may generate a signature as with a Merkle signature scheme but with a leaf node 906 at the index $Enc_k[(i-1) \cdot 2^l + 1]$ instead.

In block 708, the group member device 102 determines an authentication path for the leaf node 906 associated with the group member device 102. As described above, the leaf nodes 906 of the Merkle tree 900, 1000 are related to one time signature (OTS) public cryptographic keys, pk, and the intermediate nodes 904 are constructed from the hash of the two children nodes (e.g., $node_i = H(node_{2i} \| node_{2i+1})$), and the root of the tree, PK, is a multi-use group public key. For example, in the embodiment of FIG. 10, the cryptographic hash associated with the intermediary node ($node_0$) may be determined according to $node_0 = H_n(H_n(pk_1) \| H_n(pk_3))$. It should be appreciated that the authentication path identifies the cryptographic hashes of the sister leaf node 906 and the intermediary nodes 904 necessary to compute/rebuild the group public key. For example, the authentication path for the leaf node 906 associated with $H_n(pk_1)$ in the embodiment depicted in FIG. 10 includes $H_n(pk_3)$ and $node_1$, which may be used by the verifier device 108 to compute/rebuild the group public key PK associated with the root node 902. In block 710, the group member device 102 transmits the signature and the authentication path to the verifier device 108.

It should be appreciated that computation of the authentication path may be performed in various ways depending on the particular embodiment. For example, in the illustrative embodiment, the entire Merkle tree may be publicly "published" somewhere that is accessible to the group member device 102. As such, the group member device 102 may retrieve or access the Merkle tree or corresponding data to identify the required nodes for the authentication path of the next signature. In some embodiments, the Merkle tree may not be publicly available to everyone but may be securely accessed by the group member devices 102.

In another embodiment, only the leaf nodes 906 of the Merkle trees are publicly accessible to the group member device 102. In such embodiments, the group member device 102 builds the Merkle tree to identify the authentication path for the next signature. Although such a technique utilizes significantly less data storage than the embodiment in which the entire Merkle tree is published, the technique involves a significantly greater number of computations on the part of the group member device(s) 102 to compute the Merkle tree. In some embodiments, the leaf nodes 906 may not be publicly available to everyone but may be securely accessed by the group member devices 102.

In yet another embodiment, no information regarding the Merkle tree is publicly available. Instead, the group manager 106 is responsible for providing the relevant authentication paths to the group member devices 102. It should be appreciated that, in some embodiments, such techniques may be performed in key-generation time in which the group manager 106 transmits all of the corresponding authentication paths to each of the group member devices 102. In other embodiments, the group manager 106 may transmit the authentication paths on demand (e.g., a single authentication path for each new signature). If the key-generation time embodiment is utilized, it should be appreciated that some nodes may appear multiple times in different authentication paths; as such, the group member device 102 may employ a suitable technique for avoiding duplicate nodes, for example, to save memory cost in transmitting the authentication path ensemble. It should further be appreciated that the techniques described herein (e.g., in FIGS. 5-8) may vary depending on the particular technique utilized for managing authentication paths.

Figure 8:
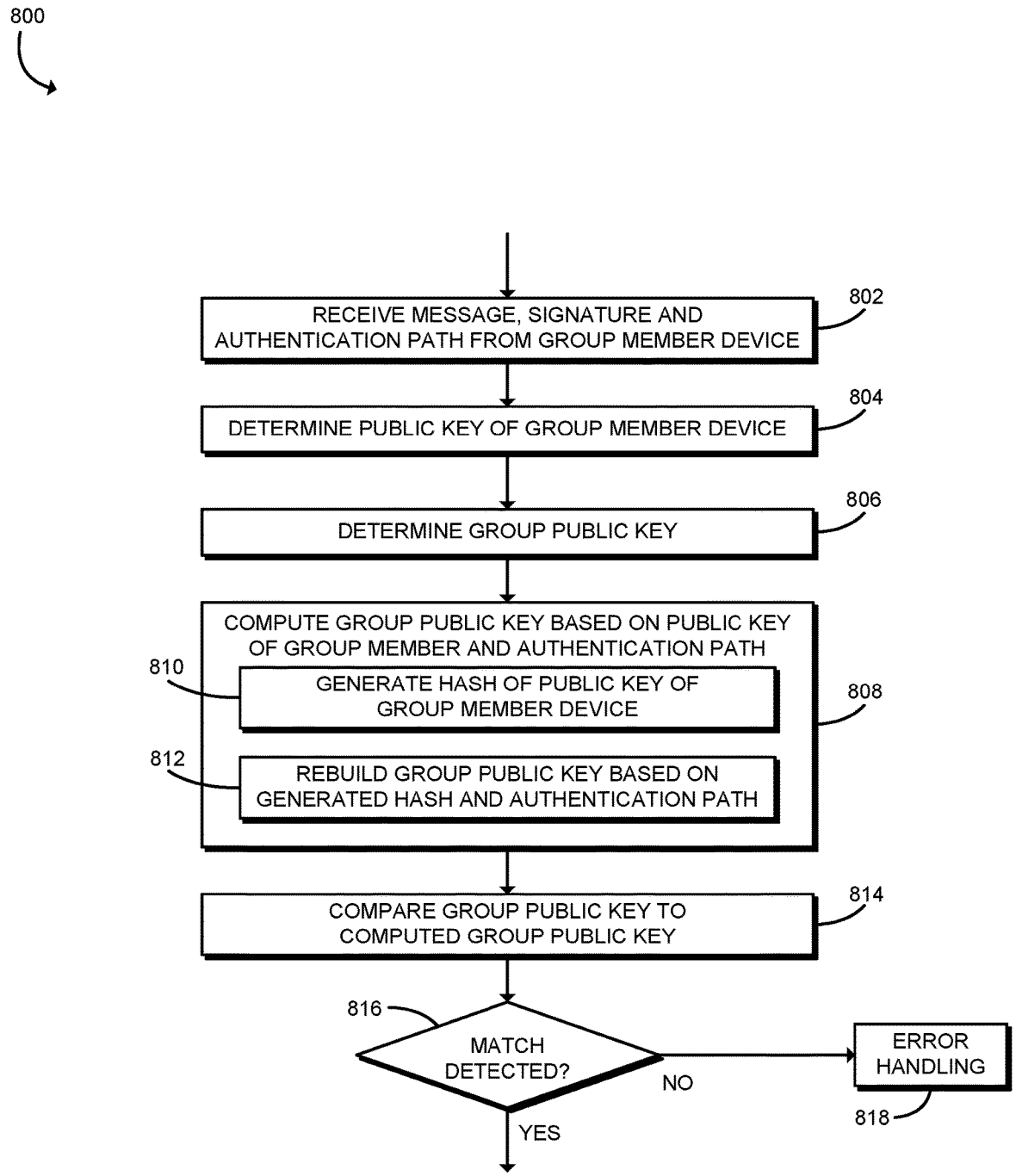
FIG. 8 is a simplified flow diagram of at least one embodiment of a method for verifying cryptographic signatures by a verifier device of the system of FIG. 1.

Referring now to FIG. 8, in use, the group member device 102 or other verifier device 108 may execute a method 800 for generating cryptographic signatures. It should be appreciated that, in some embodiments, the techniques of the method 800 may be executed by one or more of the modules of the environment 300 of the group member device 102 as shown in FIG. 3. It should be appreciated that, for clarity of the description, the verifying device (e.g., the group member device 102 or other verifier device 108) may be referenced hereinafter as the verifier device 108 to distinguish the verifying device from the signatory group member device 102. The illustrative method 800 begins with block 802 in which the verifier device 108 receives a message, a cryptographic signature of the message, and an authentication path from a group member device 102 as described above. As described above, depending on the particular embodiment, the verifier device 108 may otherwise receive the authentication path. For example, in some embodiments, the group manager 106 may be responsible for distributing the authentication paths to group member devices 102 and/or verifier devices 108. In block 804, the verifier device 108 determines the public cryptographic key of the group member device 102. For example, in some embodiments, each of the group member devices 102 may publish their generated public cryptographic keys or may transmit the corresponding public cryptographic key along with any signed message. In other embodiments, the group manager 106 may store the public cryptographic keys of the group member devices 102.

In block 806 in which the verifier device 108 determines the group public key, PK, of the group associated with the group manager 106. It should be appreciated that the group public key may be published, transmitted with the message received from the group member device 102, and/or requested from the group manager 106 depending on the particular embodiment. In block 808, the verifier device 108 computes the group public key based on the public cryptographic key of the group member device 102 and the authentication path. In doing so, in block 810, the verifier device 108 generates a cryptographic hash of the public cryptographic key of the group member device 102 and, in block 812, the verifier device 108 computes/rebuilds the group public key based on the generated cryptographic hash and the authentication path. As described above, the authentication path identifies the cryptographic hashes of the sister leaf node 906 and the intermediary nodes 904 necessary to compute/rebuild the group public key. As such, the verifier device 108 may rebuild the group public key using the cryptographic hash of the leaf node 906 associated with the group member device 102 and the other cryptographic hashes identified by the authentication path.

In block 814, the verifier device 108 compares the computed/rebuilt group public key to the actual group public key (i.e., the key identified in block 806) to determine whether the keys match. If the verifier device 108 determines, in block 816, that the two versions of the group public key match, the verifier device 108 may determine that the signature is valid and the group member device 102 is an actual member of the group. However, if the verifier device 108 determines that the two version of the group public key do not match, the verifier device 108 may perform one or more error handling procedures in block 818. For example, in some embodiments, the verifier device 108 may prevent access by the group member device 102 to any service for which the signature was being transmitted. It should be appreciated that verification of the group public key in block 820 implicitly indicates that the group member public key computed in block 804 was also valid/correct.

As described herein, it should be appreciated that the system 100 permits the group member devices 102, the group manager 106, and/or the verifier devices 108 to perform various security, privacy, and/or revocation techniques. For example, as described above, in some embodiments, the group manager 106 is able to "open" the group signatures issued by any signer, thereby revealing the signer corresponding leaf nodes 906 (allowing the tracing of signatures to signers). In some embodiments, the group manager 106 does so by decrypting the index d of the leaf node 906 used to generate the signature. In particular, the group manager 106 may compute $j=DEC_k[d]$ and check within which set it is contained $j \in C_i$ for $1 \le i \le N$, and then recover the signer $S_i$ associated with the set $C_i$.

It should be appreciated that the techniques described herein provide for private key based revocation and/or signature-based revocation. For example, if the private key $k_i$ of a signer is exposed, the verifier device 108 can generate the set of associated secret and public keys to check the components of a signature to determine whether one of the keys has been used to produce a given signature. Further, in some embodiments, a signature-based revocation can be achieved by storing and processing the "opening" process into a secure enclave (e.g., Intel® SGX) or other trusted execution environment that has access to the master block-cipher key. As such, when a signer wishes to check a signature for revocation, the signer may send the signature and a signed request (with a signed revocation list) to the trusted execution environment, which in turn verifies the signed request and compares the respective signature with the entries in the revocation list. Accordingly, the trusted execution environment may internally reveal the identities of the signers in the revocation list and compare them with the issuer of the requested signature. If the signature belongs to a revoked identity, the trusted execution environment may indicate so (e.g., with a binary output of yes/no, 1/0, etc.).

It should be appreciated that the attestation scheme described herein may achieve a quasi-optimal signature size and performance. The group signature has complexity O(1+b) in terms of hash evaluations, while a single-signer Merkle signature scheme has complexity O(1), where $2^b$ is the number of group members and $2^t$ is the number of signatures each member can issue. As such, the signature size is essentially as large as the single-signer Merkle signature scheme, which may represent a major advantage compared to other group signature schemes.

As indicated above, the attestation scheme described herein allows for linkability if the signer wishes to provide this feature to one or more verifiers, which may be realized by use of self-generated Merkle trees. That is, the user may generate a new Merkle tree using the identification of the verifier and produce a group signature on the root of the Merkle tree such that in future interactions with the verifier, the user signs its messages using the newly generated Merkle tree rather than a group signature itself. The verifier is then able to link all signatures associated with the pseudonym without revealing its identity.

EXAMPLES

Illustrative examples of the technologies disclosed herein are provided below. An embodiment of the technologies may include any one or more, and any combination of, the examples described below.

Example 1 includes a group member device for remote attestation, the group member device comprising a signature module to (i) generate a signature of a message using a cryptographic key assigned to the group member device by a group manager and (ii) determine an authentication path that indicates a plurality of cryptographic hashes necessary to compute a group public key of a group associated with a plurality of group member devices, wherein the cryptographic key is assigned to the group member device based on a permutation of a set of cryptographic keys generated by the plurality of group member devices; and a communication module to transmit the signature and the authentication path to a verifier device for verification of the signature.

Example 2 includes the subject matter of Example 1, and wherein to generate the signature comprises to generate a signature of the message using a private cryptographic key assigned to the group member device by the group manager.

Example 3 includes the subject matter of any of Examples 1 and 2, and further including a cryptographic module to (i) generate a set of cryptographic keys for remote attestation and (ii) generate a cryptographic hash of each of one or more of the cryptographic keys of the set of cryptographic keys.

Example 4 includes the subject matter of any of Examples 1-3, and wherein to generate the set of cryptographic keys comprises to determine a number of cryptographic keys to generate for remote attestation based on one of a pre-determined system parameter or an instruction from the group manager.

Example 5 includes the subject matter of any of Examples 1-4, and wherein the number of cryptographic keys is based on a number of leaf nodes assigned to each member compute device of the group in a Merkle-based signature scheme.

Example 6 includes the subject matter of any of Examples 1-5, and wherein to generate the set of cryptographic keys comprises to generate one or more asymmetric key pairs, wherein each asymmetric key pair includes a public cryptographic key and a corresponding private cryptographic key.

Example 7 includes the subject matter of any of Examples 1-6, and wherein to generate the cryptographic hash of each of the one or more cryptographic keys comprises to generate a cryptographic hash of the public cryptographic key of each symmetric key pair.

Example 8 includes the subject matter of any of Examples 1-7, and wherein to generate the set of cryptographic keys comprises to generate the set of cryptographic keys based on a random seed value.

Example 9 includes the subject matter of any of Examples 1-8, and wherein the communication module is further to (i) transmit the cryptographic hash of each of the one or more of the cryptographic keys to the group manager and (ii) receive the cryptographic key assigned to the group member device by the group manager in response to transmittal of the cryptographic hash of each of the one or more cryptographic keys to the group manager.

Example 10 includes the subject matter of any of Examples 1-9, and wherein the group public key is based on a plurality of cryptographic hashes generated by the plurality of group member devices of the group according to a Merkle-based scheme.

Example 11 includes the subject matter of any of Examples 1-10, and wherein the cryptographic key is assigned to the group member device based on a block cipher of the set of cryptographic keys generated by the plurality of group member devices.

Example 12 includes the subject matter of any of Examples 1-11, and wherein the cryptographic key is assigned to the group member device based on a random permutation of the set of cryptographic keys generated by the plurality of group member devices.

Example 13 includes a method for remote attestation by a group member device, the method comprising generating, by the group member device, a signature of a message using a cryptographic key assigned to the group member device by a group manager, wherein the cryptographic key is assigned to the group member device based on a permutation of a set of cryptographic keys generated by a plurality of group member devices; determining, by the group member device, an authentication path that indicates a plurality of cryptographic hashes necessary to compute a group public key of a group associated with the plurality of group member devices; and transmitting, by the group member device, the signature and the authentication path to a verifier device for verification of the signature.

Example 14 includes the subject matter of Example 13, and wherein generating the signature comprises generating a signature of the message using a private cryptographic key assigned to the group member device by the group manager.

Example 15 includes the subject matter of any of Examples 13 and 14, and further including generating, by the group member device, a set of cryptographic keys for remote attestation; and generating, by the group member device, a cryptographic hash of each of one or more of the cryptographic keys of the set of cryptographic keys.

Example 16 includes the subject matter of any of Examples 13-15, and wherein generating the set of cryptographic keys comprises determining a number of cryptographic keys to generate for remote attestation based on one of a pre-determined system parameter or an instruction from the group manager.

Example 17 includes the subject matter of any of Examples 13-16, and wherein the number of cryptographic keys is based on a number of leaf nodes assigned to each member compute device of the group in a Merkle-based signature scheme.

Example 18 includes the subject matter of any of Examples 13-17, and wherein generating the set of cryptographic keys comprises generating one or more asymmetric key pairs, wherein each asymmetric key pair includes a public cryptographic key and a corresponding private cryptographic key.

Example 19 includes the subject matter of any of Examples 13-18, and wherein generating the cryptographic hash of each of the one or more cryptographic keys comprises generating a cryptographic hash of the public cryptographic key of each symmetric key pair.

Example 20 includes the subject matter of any of Examples 13-19, and wherein generating the set of cryptographic keys comprises generating the set of cryptographic keys based on a random seed value.

Example 21 includes the subject matter of any of Examples 13-20, and further including transmitting, by the group member device, the cryptographic hash of each of the one or more of the cryptographic keys to the group manager; and receiving, by group member device, the cryptographic key assigned to the group member device by the group manager in response to transmittal of the cryptographic hash of each of the one or more cryptographic keys to the group manager.

Example 22 includes the subject matter of any of Examples 13-21, and wherein the group public key is based on a plurality of cryptographic hashes generated by the plurality of group member devices of the group according to a Merkle-based scheme.

Example 23 includes the subject matter of any of Examples 13-22, and wherein the cryptographic key is assigned to the group member device based on a block cipher of the set of cryptographic keys generated by the plurality of group member devices.

Example 24 includes the subject matter of any of Examples 13-23, and wherein the cryptographic key is assigned to the group member device based on a random permutation of the set of cryptographic keys generated by the plurality of group member devices.

Example 25 includes a verifier device for remote attestation, the verifier device comprising a verification module to (i) receive, from a group member device, a signature of a message generated by the group member device and an authentication path that indicates a plurality of cryptographic hashes necessary to compute a group public key of a group associated with a plurality of group member devices of the group, (ii) compute a reference group public key of the group based on the public cryptographic key of the group member device and the authentication path, and (iii) compare the reference group public key to a stored group public key of the group, wherein a match of the reference group public key and the stored group public key indicates that the signature is valid.

Example 26 includes the subject matter of Example 25, and further including a communication module to receive the stored group public key from a group manager.

Example 27 includes the subject matter of any of Examples 25 and 26, and where to compute the group public key comprises to generate a cryptographic hash of the public cryptographic key of the group member device; and rebuild the group public key based on the generated cryptographic hash and the authentication path.

Example 28 includes the subject matter of any of Examples 25-27, and wherein to rebuild the group public key comprises to rebuild the group public key based on a Merkle signature scheme.

Example 29 includes a method for remote attestation by a verifier device, the method comprising receiving, by the verifier device and from a group member device, a signature of a message generated by the group member device and an authentication path that indicates a plurality of cryptographic hashes necessary to compute a group public key of a group associated with a plurality of group member devices of the group; verifying, by the verifier device, the signature based on a public cryptographic key of the group member device; computing, by the verifier device and in response to verification of the signature, a reference group public key of the group based on the public cryptographic key of the group member device and the authentication path; and comparing, by the verifier device, the reference group public key to a stored group public key of the group, wherein a match of the reference group public key and the stored group public key indicates that the signature is valid.

Example 30 includes the subject matter of Example 29, and further including receiving, by the verifier device, the stored group public key from a group manager.

Example 31 includes the subject matter of any of Examples 29 and 30, and where computing the group public key comprises generating a cryptographic hash of the public cryptographic key of the group member device; and rebuilding the group public key based on the generated cryptographic hash and the authentication path.

Example 32 includes the subject matter of any of Examples 29-31, and wherein rebuilding the group public key comprises rebuilding the group public key based on a Merkle signature scheme.

Example 33 includes a group manager device for remote attestation, the group manager device comprising a communication module to receive one or more cryptographic hashes from each group member device of a group associated with the group manager device, wherein each cryptographic hash is a hash of a cryptographic key of the corresponding group member device; and an assignment module to reassign the one or more cryptographic hashes and corresponding cryptographic keys to the group member devices based on a permutation of the cryptographic hashes, wherein the communication module is further to transmit a message to each group member device indicative of a corresponding reassigned cryptographic hash and cryptographic key.

Example 34 includes the subject matter of Example 33, and wherein the cryptographic hash is a hash of a public cryptographic key of the corresponding group member device.

Example 35 includes the subject matter of any of Examples 33 and 34, and wherein to reassign the one or more cryptographic hashes comprises to permute an original order of the one or more cryptographic hashes.

Example 36 includes the subject matter of any of Examples 33-35, and wherein to permute the original order of the one or more cryptographic hashes comprises to apply a block cipher to the one or more cryptographic hashes.

Example 37 includes a method for remote attestation by a group manager device, the method comprising receiving, by the group manager device, one or more cryptographic hashes from each group member device of a group associated with the group manager device, wherein each cryptographic hash is a hash of a cryptographic key of the corresponding group member device; reassigning, by the group manager device, the one or more cryptographic hashes and corresponding cryptographic keys to the group member devices based on a permutation of the cryptographic hashes; and transmitting, by the group manager device, a message to each group member device indicative of a corresponding reassigned cryptographic hash and cryptographic key.

Example 38 includes the subject matter of Example 37, and wherein the cryptographic hash is a hash of a public cryptographic key of the corresponding group member device.

Example 39 includes the subject matter of any of Examples 37 and 38, and wherein reassigning the one or more cryptographic hashes comprises permuting an original order of the one or more cryptographic hashes.

Example 40 includes the subject matter of any of Examples 37-39, and wherein permuting the original order of the one or more cryptographic hashes comprises applying a block cipher to the one or more cryptographic hashes.

Example 41 includes a computing device comprising a processor; and a memory having stored therein a plurality of instructions that when executed by the processor cause the computing device to perform the method of any of Examples 13-24, 30-34, or 37-40.

Example 42 includes one or more machine-readable storage media comprising a plurality of instructions stored thereon that in response to being executed result in a computing device performing the method of any of Examples 13-24, 30-34, or 37-40.

Example 43 includes a computing device comprising means for performing the method of any of Examples 13-24, 29-32, or 37-40.

Example 44 includes a group member device for remote attestation, the group member device comprising means for generating a signature of a message using a cryptographic key assigned to the group member device by a group manager, wherein the cryptographic key is assigned to the group member device based on a permutation of a set of cryptographic keys generated by a plurality of group member devices; means for determining an authentication path that indicates a plurality of cryptographic hashes necessary to compute a group public key of a group associated with the plurality of group member devices; and means for transmitting the signature and the authentication path to a verifier device for verification of the signature.

Example 45 includes the subject matter of Example 44, and wherein the means for generating the signature comprises means for generating a signature of the message using a private cryptographic key assigned to the group member device by the group manager.

Example 46 includes the subject matter of any of Examples 44 and 45, and further including means for generating a set of cryptographic keys for remote attestation;

and means for generating a cryptographic hash of each of one or more of the cryptographic keys of the set of cryptographic keys.

Example 47 includes the subject matter of any of Examples 44-46, and wherein the means for generating the set of cryptographic keys comprises means for determining a number of cryptographic keys to generate for remote attestation based on one of a pre-determined system parameter or an instruction from the group manager.

Example 48 includes the subject matter of any of Examples 44-47, and wherein the number of cryptographic keys is based on a number of leaf nodes assigned to each member compute device of the group in a Merkle-based signature scheme.

Example 49 includes the subject matter of any of Examples 44-48, and wherein the means for generating the set of cryptographic keys comprises means for generating one or more asymmetric key pairs, wherein each asymmetric key pair includes a public cryptographic key and a corresponding private cryptographic key.

Example 50 includes the subject matter of any of Examples 44-49, and wherein the means for generating the cryptographic hash of each of the one or more cryptographic keys comprises means for generating a cryptographic hash of the public cryptographic key of each symmetric key pair.

Example 51 includes the subject matter of any of Examples 44-50, and wherein the means for generating the set of cryptographic keys comprises means for generating the set of cryptographic keys based on a random seed value.

Example 52 includes the subject matter of any of Examples 44-51, and further including means for transmitting the cryptographic hash of each of the one or more of the cryptographic keys to the group manager; and means for receiving the cryptographic key assigned to the group member device by the group manager in response to transmittal of the cryptographic hash of each of the one or more cryptographic keys to the group manager.

Example 53 includes the subject matter of any of Examples 44-52, and wherein the group public key is based on a plurality of cryptographic hashes generated by the plurality of group member devices of the group according to a Merkle-based scheme.

Example 54 includes the subject matter of any of Examples 44-53, and wherein the cryptographic key is assigned to the group member device based on a block cipher of the set of cryptographic keys generated by the plurality of group member devices.

Example 55 includes the subject matter of any of Examples 44-54, and wherein the cryptographic key is assigned to the group member device based on a random permutation of the set of cryptographic keys generated by the plurality of group member devices.

Example 56 includes a verifier device for remote attestation, the verifier device comprising means for receiving, from a group member device, a signature of a message generated by the group member device and an authentication path that indicates a plurality of cryptographic hashes necessary to compute a group public key of a group associated with a plurality of group member devices of the group; means for verifying the signature based on a public cryptographic key of the group member device; means for computing, in response to verification of the signature, a reference group public key of the group based on the public cryptographic key of the group member device and the authentication path; and means for comparing the reference group public key to a stored group public key of the group, wherein a match of the reference group public key and the stored group public key indicates that the signature is valid.

Example 57 includes the subject matter of Example 56, and further including means for receiving the stored group public key from a group manager.

Example 58 includes the subject matter of any of Examples 56 and 57, and where the means for computing the group public key comprises means for generating a cryptographic hash of the public cryptographic key of the group member device; and means for rebuilding the group public key based on the generated cryptographic hash and the authentication path.

Example 59 includes the subject matter of any of Examples 56-58, and wherein the means for rebuilding the group public key comprises means for rebuilding the group public key based on a Merkle signature scheme.

Example 60 includes a group manager device for remote attestation, the group manager device comprising means for receiving, by the group manager device, one or more cryptographic hashes from each group member device of a group associated with the group manager device, wherein each cryptographic hash is a hash of a cryptographic key of the corresponding group member device; means for reassigning, by the group manager device, the one or more cryptographic hashes and corresponding cryptographic keys to the group member devices based on a permutation of the cryptographic hashes; and means for transmitting, by the group manager device, a message to each group member device indicative of a corresponding reassigned cryptographic hash and cryptographic key.

Example 61 includes the subject matter of Example 60, and wherein the cryptographic hash is a hash of a public cryptographic key of the corresponding group member device.

Example 62 includes the subject matter of any of Examples 60 and 61, and wherein the means for reassigning the one or more cryptographic hashes comprises means for permuting an original order of the one or more cryptographic hashes.

Example 63 includes the subject matter of any of Examples 60-62, and wherein the means for permuting the original order of the one or more cryptographic hashes comprises means for applying a block cipher to the one or more cryptographic hashes.

The invention claimed is:

1. A group member device for remote attestation, the group member device comprising:
a signature circuit to (i) generate a signature of a message using a cryptographic key assigned to the group member device by a group manager and (ii) determine an authentication path that indicates a plurality of cryptographic hashes necessary to compute a group public key of a group associated with a plurality of group member devices, wherein the plurality of group member devices includes the group member device and each group member device of the group member devices is different from the group manager, wherein the cryptographic key is assigned to the group member device based on a permutation of a set of cryptographic keys generated by the plurality of group member devices, and wherein each cryptographic key of the set of cryptographic keys is generated by a different group member device of the plurality of group member devices and provided to the group manager by the corresponding different group member device; and a communication circuit to transmit the signature and the authentication path to a verifier device for verification of the signature.

2. The group member device of claim 1, wherein to generate the signature comprises to generate a signature of the message using a private cryptographic key assigned to the group member device by the group manager.

3. The group member device of claim 1, further comprising a cryptographic circuit to (i) generate a set of cryptographic keys for remote attestation and (ii) generate a cryptographic hash of each of one or more of the cryptographic keys of the set of cryptographic keys.

4. The group member device of claim 3, wherein to generate the set of cryptographic keys comprises to determine a number of cryptographic keys to generate for remote attestation based on one of a pre-determined system parameter or an instruction from the group manager.

5. The group member device of claim 4, wherein the number of cryptographic keys is based on a number of leaf nodes assigned to each member compute device of the group in a Merkle-based signature scheme.

6. The group member device of claim 3, wherein to generate the set of cryptographic keys comprises to generate one or more asymmetric key pairs, wherein each asymmetric key pair includes a public cryptographic key and a corresponding private cryptographic key.

7. The group member device of claim 6, wherein to generate the cryptographic hash of each of the one or more cryptographic keys comprises to generate a cryptographic hash of the public cryptographic key of each asymmetric key pair.

8. The group member device of claim 3, wherein to generate the set of cryptographic keys comprises to generate the set of cryptographic keys based on a random seed value.

9. The group member device of claim 3, wherein the communication circuit is further to (i) transmit the cryptographic hash of each of the one or more of the cryptographic keys to the group manager and (ii) receive the cryptographic key assigned to the group member device by the group manager in response to transmittal of the cryptographic hash of each of the one or more cryptographic keys to the group manager.

10. The group member device of claim 1, wherein the group public key is based on a plurality of cryptographic hashes generated by the plurality of group member devices of the group according to a Merkle-based scheme.

11. The group member device of claim 1, wherein the cryptographic key is assigned to the group member device based on a block cipher of the set of cryptographic keys generated by the plurality of group member devices.

12. The group member device of claim 1, wherein the cryptographic key is assigned to the group member device based on a random permutation of the set of cryptographic keys generated by the plurality of group member devices.

13. One or more non-transitory, machine-readable storage media comprising a plurality of instructions stored thereon that, in response to execution by a group member device, causes the group member device to:

generate a signature of a message using a cryptographic key assigned to the group member device by a group manager, wherein the plurality of group member devices includes the group member device and each group member device of the group member devices is different from the group manager, wherein the cryptographic key is assigned to the group member device based on a permutation of a set of cryptographic keys generated by a plurality of group member devices, and wherein each cryptographic key of the set of cryptographic keys is generated by a different group member device of the plurality of group member devices and provided to the group manager by the corresponding different group member device;

determine an authentication path that indicates a plurality of cryptographic hashes necessary to compute a group public key of a group associated with the plurality of group member devices; and transmit the signature and the authentication path to a verifier device for verification of the signature.

14. The one or more non-transitory, machine-readable storage media of claim 13, wherein to generate the signature comprises to generate a signature of the message using a private cryptographic key assigned to the group member device by the group manager.

15. The one or more non-transitory, machine-readable storage media of claim 13, wherein the plurality of instructions further causes the group member device to:

generate a set of cryptographic keys for remote attestation; and generate a cryptographic hash of each of one or more of the cryptographic keys of the set of cryptographic keys.

16. The one or more non-transitory, machine-readable storage media of claim 15, wherein to generate the set of cryptographic keys comprises to generate one or more asymmetric key pairs, wherein each asymmetric key pair includes a public cryptographic key and a corresponding private cryptographic key.

17. The one or more non-transitory, machine-readable storage media of claim 16, wherein to generate the cryptographic hash of each of the one or more cryptographic keys comprises to generate a cryptographic hash of the public cryptographic key of each asymmetric key pair.

18. The one or more non-transitory, machine-readable storage media of claim 15, wherein the plurality of instructions further causes the group member device to:

transmit the cryptographic hash of each of the one or more of the cryptographic keys to the group manager; and receive the cryptographic key assigned to the group member device by the group manager in response to transmittal of the cryptographic hash of each of the one or more cryptographic keys to the group manager.

19. The one or more non-transitory, machine-readable storage media of claim 13, wherein the cryptographic key is assigned to the group member device based on a block cipher of the set of cryptographic keys generated by the plurality of group member devices.

* * * * *